Feb. 4, 1969  J. G. CADIOU  3,425,292
SYNCHROMESH TRANSMISSION
Filed Sept. 27, 1966
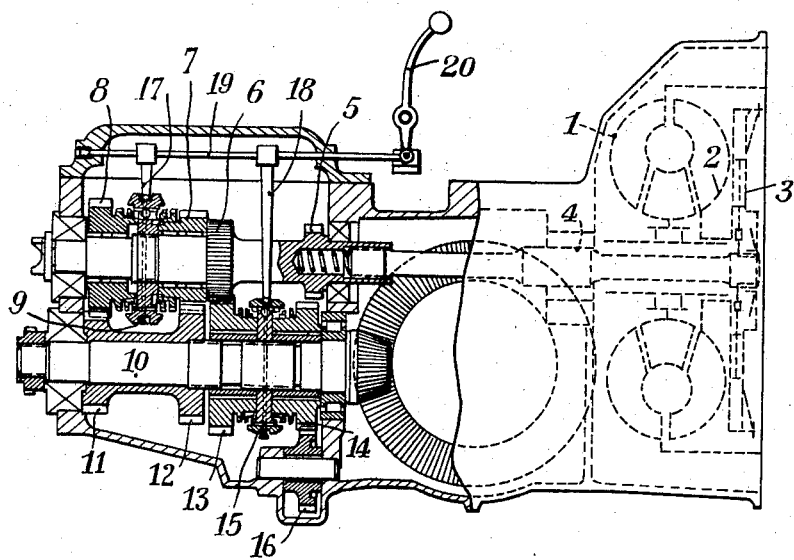
INVENTOR
JEAN G. CADIOU

United States Patent Office 3,425,292
Patented Feb. 4, 1969

3,425,292
SYNCHROMESH TRANSMISSION
Jean G. Cadiou, 26 Rue Desrenandes,
Paris, France
Filed Sept. 27, 1966, Ser. No. 582,365
Claims priority, application France, Oct. 15, 1965,
35,094
U.S. Cl. 74—359  1 Claim
Int. Cl. F16h 3/12

ABSTRACT OF THE DISCLOSURE

A transmission for automotive vehicle comprises a primary shaft rigidly connected to the driven member of a hydraulic coupling of which the driving member is actuated from the vehicle engine with the interposition of a clutch, and a secondary shaft rotatably driven from said primary shaft and actuating the wheels of the vehicle. Each one of these two shafts carries two pairs of gears each meshing with a pair of gears carried by the other shaft. In each assembly comprising two pairs of gears in mutual meshing engagement one pair is rigid with the shaft carrying same and the other pair consists of two gears rotatably mounted on the other shaft, one of these last-named gears being adapted to be locked at will to this shaft. In one of these two assemblies consisting of two pairs of gears in mutual meshing engagement, one of the gears of one pair meshes with the corresponding gear of the other pair through the medium of a reversing gear.

---

In change-speed gears or gearboxes, notably for automotive vehicles, of the so-called synchromesh type, that is, wherein the main or primary shaft is driven from the engine with the interposition of a torque converter, the synchronization is effective only for forward speeds, not for reverse speeds. As a result, in certain manoeuvres, notably when parking a vehicle or driving along difficult roads, some cares must be taken when engaging the reverse, the first care consisting in bringing the vehicle to a complete standstill; in any case, an undesired idle period is introduced. Moreover the mechanism of these known transmissions is rather complicated.

It is the object of this invention to provide a synchromesh transmission permitting of engaging the reverse speed without any idle period while having a mechanism considerably simpler than those of hitherto known synchromesh transmissions.

To this end, the reverse gear is synchronized like the other gears, notably like the forward gears, and a same sliding hub movable along the lay or counter-shaft under the control of a single selector fork controls the engagement of the first or low gear, or the reverse gear, according to the direction in which this fork is actuated.

Thus, the use of a special reverse control fork is dispensed with, as contrasted with conventional synchromesh transmissions.

The features and advantages of this invetion will appear more completely from the following description given by way of illustration and not of limitation, with reference to the single figure of the attached drawing showing diagrammatically in fragmentary section a typical form of embodiment of the transmission constructed according to the teachings of this invention, the section being taken along the axes of the primary or main shaft and lay or counter shaft and comprising in the section plane the axis of the reverse lay shaft.

The input member of the transmission mechanism consists of the armature, positively coupled for rotation to the engine output shaft (not shown) of the driving member 1 of a hydraulic torque converter having its driven member 2 adapted to be rotatably coupled through a friction clutch 3 to the primary or main shaft 4 of the transmission mechanism.

The primary or main shaft 4 has rigidly mounted thereon a pair of gears 5 and 6 and a sliding hub 9 which is associated with another pair of gears 7, 8 and is rotatably solid with this shaft but adapted to slide axially thereon under the control of a selector or shifting fork 17 constantly engaging the peripheral groove of a striking ring 9a to shift the hub 9 into engagement with either gear 7 or 8 to connect it to the shaft. The fork 17 is mounted on a rod 19 actuatable by means of the gear shift lever 20.

The counter shaft 10 rotatably mounted in the transmission casing parallel to the main shaft 4, rigidly carries a pair of gears 11, 12 in constant meshing engagement with the aforesaid gears 8, 7 respectively of main shaft 4, and also another sliding hub 15 which is associated with another pair of gears 13, 14 and is rotatably rigid with the counter shaft but adapted to slide in relation thereto under the control of the corresponding peripheral grooved ring 15 of another selector or control fork 18 to connect gear 13 or gear 14 to the shaft. The gear 13 associated with this countershaft sliding hub is in constant meshing engagement with a gear 6 rigidly carried by the primary shaft 4. The second gear 14 associated with this countershaft sliding hub is in constant meshing engagement with a gear 16 mounted on a fixed reverse-speed shaft in the transmission casing and in constant meshing engagement with the first gear 5 carried by the main shaft 4. A bevel pinion 21 on shaft 10 drives bevel gear 22 and its the output of the transmission.

The drawing shows the gearbox in its neutral position. Moving the fork 18 mounted on the rod 19 of gear shift lever 20 to the right or to the left will move the ring 15 in the same direction to engage either the reverse speed by transmitting the input torque from gear 14 to the reverse gear 16, or the first or low forward speed by transmitting the torque from gear 13 to gear 6. Moving the other ring 9 to the right or to the left with respect to the neutral position in which it is shown in the drawing will engage either the second or intermediate speed by transmitting the input torque from gear 12 to gear 7, or a third or top speed by transmitting the input torque from gear 11 to gear 8.

It will be seen that with the arrangement described hereinabove and illustrated in the drawing it is possible, by moving the striking ring 15 to the right, to shift directly from the first or low forward gear to reverse gear, which is particularly advantageous under certain driving conditions and definitely precluded with conventional-type synchromesh transmissions.

Moreover, the construction according to this invention is considerably simplified with respect to hitherto known arrangements requiring the use, for engaging the reverse, of a special shifting fork and a movable or sliding reverse gear, as contrasted with the above-described construction wherein the reverse speed is engaged by actuating the same fork as that provided for engaging the first or low forward speed; besides, the reversing gear in constant meshing engagement with a gear rigidly carried by the main shaft 4 is mounted on a shaft rigid with the transmission casing.

Of course, many modifications and variations may be brought to the form of embodiment described hereinabove by way of example with reference to the attached drawing, but it will readily occur to anybody conversant with the art that these modifications and variations would not constitute a departure from the spirit and scope of the invention as set forth in the appended claims.

Thus, the torque converter 1, 2 may be omitted from the assembly.

What I claim is:
1. Transmission mechanism for an automotive vehicle comprising an engine output shaft, a clutch and a hydraulic coupling consisting of a driving member connected to said shaft through said clutch and a driven member, said transmission comprising a case, a primary shaft rigid with said driven member of said hydraulic coupling and a secondary shaft for transmitting the motion to the wheels of the vehicle, said primary and secondary shafts being parallel and rotatably mounted in said case, a first pair of gears rigidly mounted on one of said shafts, another pair of gears rotatably mounted on the other shaft and meshing with the two gears of said first pair of gears respectively, a first clutch member adapted to alternatively rotatably connect either of said gears of said other pair of gears to said other shaft, a third pair of gears rigidly mounted on one of said two shafts, a fourth pair of gears rotatably mounted on the other shaft and of which the first gear is in constant meshing engagement with the first gear of said third pair of gears, a reversing gear rotatably mounted in said case, the second gears of said third and fourth pairs of gears being in constant meshing engagement with said reversing gear, and a second clutch member adapted to alternatively rotatably connect either of the gears of said fourth pair of gears to said other shaft.

References Cited
UNITED STATES PATENTS

| | | | |
|---|---|---|---|
| 1,843,523 | 2/1932 | Starkey et al. | 74—375 |
| 2,542,911 | 2/1951 | Eaton | 74—360 |
| 3,028,764 | 4/1962 | Randol | 74—375 |

DONLEY J. STOCKING, *Primary Examiner.*

HENRY S. LAYTON, *Assistant Examiner.*